US009002544B1

(12) United States Patent
Seah et al.

(10) Patent No.: US 9,002,544 B1
(45) Date of Patent: Apr. 7, 2015

(54) SYSTEM, DEVICE, AND METHOD FOR PRESENTING INSTRUMENT APPROACH PROCEDURE ADVISORY INFORMATION TO A PILOT ON AN AIRCRAFT

(75) Inventors: Kirschen A. Seah, Cedar Rapids, IA (US); Alan E. Siniff, Marlon, IA (US); Michael J. Beccario, Cedar Rapids, IA (US); Sarah Barber, Cedar Rapids, IA (US); Randy H. Jacobson, Melbourne, FL (US); Simon A. Grosvenor, Everett, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 313 days.

(21) Appl. No.: 13/459,273

(22) Filed: Apr. 30, 2012

(51) Int. Cl.
*G01C 23/00* (2006.01)

(52) U.S. Cl.
CPC .................... *G01C 23/005* (2013.01)

(58) Field of Classification Search
CPC ...... G01C 23/00; G01C 23/005; G01C 5/005; G01C 5/02; G01C 5/06; G01C 9/00; G01C 9/005; G01S 13/88; G01S 13/882; G01S 13/91; G01S 13/913; G01S 13/92; G01S 13/93; G01S 13/9303; G01S 13/95; G01S 13/951; G01S 13/953; G01S 2013/916; G01S 2013/93; G01S 2205/003; G01S 2205/005; G05D 1/0083; G05D 1/02; G05D 1/0202; G05D 1/0204; G05D 1/04; G05D 1/042; G05D 1/044; G05D 1/046; G05D 1/048; G05D 1/06; G05D 1/0607; G05D 1/0615; G05D 1/0623; G05D 1/063; G05D 1/0638; G05D 1/0646; G05D 1/0653; G05D 1/0661; G05D 1/0669; G05D 1/0676; G05D 1/0684; G05D 1/0692; G05D 1/08; G05D 1/0808; G05D 1/0816; G05D 1/0825; G05D 1/0841; G05D 1/085; G05D 1/0858; G05D 1/0866; G05D 1/0875; G05D 1/0883; G05D 1/0891; G05D 1/10; G08G 5/00; G08G 5/0004; G08G 5/0008; G08G 5/0013; G08G 5/0017; G08G 5/0021; G08G 5/0026; G08G 5/003; G08G 5/0034; G08G 5/0039; G08G 5/0043; G08G 5/0047; G08G 5/0052; G08G 5/0056; G08G 5/006; G08G 5/0065; G08G 5/0069; G08G 5/0073; G08G 5/0078; G08G 5/0082; G08G 5/0086; G08G 5/0091; G08G 5/0095; G08G 5/02; G08G 5/025; G08G 5/04; G08G 5/045; G08G 5/06; G08G 5/065
USPC ................... 701/16, 120–122, 411, 416, 423
See application file for complete search history.

(56) References Cited

U.S. PATENT DOCUMENTS

| | | | | |
|---|---|---|---|---|
| 5,978,715 A | * | 11/1999 | Briffe et al. ..................... | 701/11 |
| 6,199,008 B1 | * | 3/2001 | Aratow et al. ................. | 701/120 |
| 2010/0280753 A1 | * | 11/2010 | Chytil et al. .................. | 701/208 |

OTHER PUBLICATIONS

U.S. Appl. No. 12/283,399, filed Sep. 8, 2008, Barber.

(Continued)

*Primary Examiner* — Jerrah Edwards
(74) *Attorney, Agent, or Firm* — Angel N. Gerdzhikov; Donna P. Suchy; Daniel M. Barbieri

(57) ABSTRACT

A present novel and non-trivial system, device, and method for presenting instrument approach procedure ("IAP") advisory information to a pilot of an aircraft are disclosed. An advisory generator ("AG") is programmed to retrieve or receive flight information representative of the current position of the aircraft, a designated airport, and at least one published IAP; weather minima data corresponding to each IAP; and one or more IAP suitability factors from a weather data source, a NOTAM data source, and/or an aircraft performance data source. The AG determines the suitability or availability of each published IAP, disables the pilot's selectability of each unsuitable or unavailable published IAP, and generates advisory data representative of information advising the pilot of the unsuitable or unavailable published IAP (s). Additionally, the AG is programmed to receive a pilot's override of an unsuitable or unavailable published IAP and enable the overridden unsuitable or unavailable IAP.

20 Claims, 8 Drawing Sheets

(56) References Cited

OTHER PUBLICATIONS

U.S. Appl. No. 12/569,919, filed Sep. 30, 2009, Chiew et al.

"Instrument Procedures Handbook," 2007, Chapter 5, pp. 5-1 through 5-68, FAA-H-8261-1A, U.S. Federal Aviation Administration.

* cited by examiner

| CATEGORY | A | B | C | D |
|---|---|---|---|---|
| S-ILS 9 | | *1057/24 200 (200-½) | | |
| S-LOC 9 | 1360/24 503 (500-1) | | 1360/50 503 (500-1) | 1420-2 551 (600-2) |
| CIRCLING | 1360-1 491 (500-1) | | | |
| OPHAW FIX MINIMUMS | | | | |
| S-LOC 9 | 1220/24 363 (400-¾) | | | 1220/40 363 (400-¾) |
| CIRCLING | 1280-1 411 (500-1) | 1320-1 451 (500-1) | 1320-1½ 451 (500-1½) | 1420-2 551 (600-2) |

CEDAR RAPIDS/THE EASTERN IOWA (CID)
ILS or LOC RWY 9

| CATEGORY | A | B | C | D |
|---|---|---|---|---|
| LPV DA | | 1057/24 200 (200-½) | | |
| LNAV/VNAV DA | | 1204/40 347 (400-¾) | | |
| LNAV MDA | 1240/24 347 (400-½) | | | 1240/50 383 (400-1) |
| CIRCLING | 1280-1 411 (500-1) | 1320-1 451 (500-1) | 1320-1½ 451 (500-1½) | 1420-2 551 (600-2) |

CEDAR RAPIDS/THE EASTERN IOWA (CID)
RNAV (GPS) RWY 9

| CATEGORY | A | B | C | D |
|---|---|---|---|---|
| S-9 | 1240/24 383 (400-½) | | 1320-1½ 451 (500-1½) | 1240/50 383 (400-1) |
| CIRCLING | 1280-1 411 (500-1) | 1320-1 451 (500-1) | 1320-1½ 451 (500-1½) | 1420-2 551 (600-2) |

CEDAR RAPIDS/THE EASTERN IOWA (CID)
VOR/DME RWY 9

| CATEGORY | A | B | C | D |
|---|---|---|---|---|
| LPV DA | | 1120-1 251 (300-1) | | |
| LNAV/VNAV DA | | 1200-1¼ 331 (400-1¼) | | |
| LNAV MDA | 1260-1 391 (400-1) | | | 1260-1¼ 391 (400-1¼) |
| CIRCLING | 1280-1 411 (500-1) | 1320-1 451 (500-1) | 1320-1½ 451 (500-1½) | 1420-2 551 (600-2) |

CEDAR RAPIDS/THE EASTERN IOWA (CID)
RNAV (GPS) RWY 13

FIG. 2A

| CATEGORY | A | B | C | D |
|---|---|---|---|---|
| S-ILS 27 | | 1062/24 200 (200-½) | | |
| S-LOC 27 | 1260/24 398 (400-½) | | 1260/35 398 (400-¾) | 1420-2 551 (600-2) |
| CIRCLING | 1280-1 411 (500-1) | 1320-1 451 (500-1) | 1320-1½ 451 (500-1½) | 1420-2 551 (600-2) |

CEDAR RAPIDS/THE EASTERN IOWA (CID)
ILS or LOC RWY 27

| CATEGORY | A | B | C | D |
|---|---|---|---|---|
| LPV DA | | 1112/24 250 (300-½) | | |
| LNAV/VNAV DA | 1163/24 301 (300-¾) | | | 1163/40 301 (300-¾) |
| LNAV MDA | 1260/24 398 (400-½) | | | 1260/50 383 (400-1) |
| CIRCLING | 1280-1 411 (500-1) | 1320-1 451 (500-1) | 1320-1½ 451 (500-1½) | 1420-2 551 (600-2) |

CEDAR RAPIDS/THE EASTERN IOWA (CID)
RNAV (GPS) RWY 27

| CATEGORY | A | B | C | D |
|---|---|---|---|---|
| S-27 | | 1260/24 398 (400-½) | | 1260/50 393 (400-1) |
| CIRCLING | 1280-1 411 (500-1) | 1320-1 451 (500-1) | 1320-1½ 451 (500-1½) | 1420-2 551 (600-2) |

CEDAR RAPIDS/THE EASTERN IOWA (CID)
VOR RWY 27

| CATEGORY | A | B | C | D |
|---|---|---|---|---|
| LPV DA | | 1120-½ 259 (300-½) | | |
| LNAV/VNAV DA | 1140-½ 279 (300-¾) | | | 1140-¾ 279 (300-¾) |
| LNAV MDA | 1240-½ 379 (400-½) | | | 1240-1 379 (400-1) |
| CIRCLING | 1280-1 411 (500-1) | 1320-1 451 (500-1) | 1320-1½ 451 (500-1½) | 1420-2 551 (600-2) |

CEDAR RAPIDS/THE EASTERN IOWA (CID)
RNAV (GPS) RWY 31

FIG. 2B

```
          CID – APPROACH PROCEDURES

1L   <ILS RWY 9                    ILS RWY 27>      1R

2L   <LOC RWY 9                    LOC RWY 27>      2R

3L   <VOR/DME RWY 9                VOR RWY 27>      3R

4L   <RNAV (GPS) RWY 9         RNAV (GPS) RWY 27>   4R

5L   <RNAV (GPS) RWY 13        RNAV (GPS) RWY 31>   5R 6L                                                  6R
```

FIG. 3A

```
          CID – APPROACH PROCEDURES

1L   <ILS RWY 9                      ILS RWY 27       1R
                                   UNSUITABLE - WX
2L   <LOC RWY 9                      LOC RWY 27       2R
                                   UNSUITABLE - WX
3L   <VOR/DME RWY 9                  VOR RWY 27       3R
                                   UNSUITABLE - WX
4L   <RNAV (GPS) RWY 9            RNAV (GPS) RWY 27   4R
                                   UNSUITABLE - WX
5L    RNAV (GPS) RWY 13           RNAV (GPS) RWY 31   5R
      UNSUITABLE - WX              UNSUITABLE - WX
6L                                                    6R
```

FIG. 3B

CID – APPROACH PROCEDURES

| | |
|---|---|
| <ILS RWY 9 | ILS RWY 27 > UNSUITABLE - WX |
| <LOC RWY 9 | LOC RWY 27 UNSUITABLE - WX |
| <VOR/DME RWY 9 | VOR RWY 27 UNSUITABLE - WX |
| <RNAV (GPS) RWY 9 | RNAV (GPS) RWY 27 UNSUITABLE - WX |
| RNAV (GPS) RWY 13 UNSUITABLE - WX | RNAV (GPS) RWY 31 UNSUITABLE - WX |

FIG. 3C

CID – APPROACH PROCEDURES

| | |
|---|---|
| <ILS RWY 9 | ILS RWY 27 UNSUITABLE - WX |
| LOC RWY 9 UNSUITABLE - WX | LOC RWY 27 UNSUITABLE - WX |
| VOR/DME RWY 9 UNSUITABLE - WX | VOR RWY 27 UNSUITABLE - WX |
| <RNAV (GPS) RWY 9 | RNAV (GPS) RWY 27 UNSUITABLE - WX |
| RNAV (GPS) RWY 13 UNSUITABLE - WX | RNAV (GPS) RWY 31 UNSUITABLE - WX |

FIG. 3D

CID – APPROACH PROCEDURES

| | |
|---|---|
| <ILS RWY 9 | ILS RWY 27<br>UNSUITABLE - WX |
| LOC RWY 9<br>UNSUITABLE - WX | LOC RWY 27<br>UNSUITABLE - WX |
| VOR/DME RWY 9<br>UNSUITABLE - WX | VOR RWY 27<br>UNSUITABLE - WX |
| RNAV (GPS) RWY 9<br>UNSUITABLE - GPS | RNAV (GPS) RWY 27<br>UNSUITABLE - WX |
| RNAV (GPS) RWY 13<br>UNSUITABLE - WX | RNAV (GPS) RWY 31<br>UNSUITABLE - WX |

FIG. 3E

CID – APPROACH PROCEDURES

| | |
|---|---|
| ILS RWY 9<br>UNSUITABLE – X-WIND | ILS RWY 27<br>UNSUITABLE - WX |
| LOC RWY 9<br>UNSUITABLE - WX | LOC RWY 27<br>UNSUITABLE - WX |
| VOR/DME RWY 9<br>UNSUITABLE - WX | VOR RWY 27<br>UNSUITABLE - WX |
| RNAV (GPS) RWY 9<br>UNSUITABLE - GPS | RNAV (GPS) RWY 27<br>UNSUITABLE - WX |
| RNAV (GPS) RWY 13<br>UNSUITABLE - WX | RNAV (GPS) RWY 31<br>UNSUITABLE - WX |

FIG. 3F

CID – APPROACH PROCEDURES

| | |
|---|---|
| ILS RWY 9 | ILS RWY 27 |
| UNAVAIL - NOTAM | UNAVAIL - NOTAM |
| LOC RWY 9 | LOC RWY 27 |
| UNAVAIL - NOTAM | UNAVAIL - NOTAM |
| VOR/DME RWY 9 | VOR RWY 27 |
| UNAVAIL - NOTAM | UNAVAIL - NOTAM |
| RNAV (GPS) RWY 9 | RNAV (GPS) RWY 27 |
| UNAVAIL - NOTAM | UNAVAIL - NOTAM |
| <RNAV (GPS) RWY 13 | RNAV (GPS) RWY 31> |

FIG. 3G

CID – APPROACH PROCEDURES

| | |
|---|---|
| ILS RWY 9 | ILS RWY 27 |
| UNAVAIL - NOTAM | UNAVAIL - NOTAM |
| LOC RWY 9 | LOC RWY 27 |
| UNAVAIL - NOTAM | UNAVAIL - NOTAM |
| VOR/DME RWY 9 | VOR RWY 27 |
| UNAVAIL - NOTAM | UNAVAIL - NOTAM |
| RNAV (GPS) RWY 9 | RNAV (GPS) RWY 27 |
| UNAVAIL - NOTAM | UNAVAIL - NOTAM |
| RNAV (GPS) RWY 13 | RNAV (GPS) RWY 31 |
| UNSUITABLE - WX | UNSUITABLE - WX |
| <UNPUBLISHED RWY 31 | |

SYSTEM, DEVICE, AND METHOD FOR PRESENTING INSTRUMENT APPROACH PROCEDURE ADVISORY INFORMATION TO A PILOT ON AN AIRCRAFT

BACKGROUND OF THE INVENTION

1. Field of the Invention

This invention pertains generally to the field of aircraft display units that provide information to the pilot or flight crew of an aircraft.

2. Description of the Related Art

Prior to the flight of an aircraft, pilots perform a preflight planning phase in which they gather information related to the conduct of their flight. Weather and Notices to Airmen (singularly, "NOTAM") along the planned route of flight and at the destination and/or alternate airports can be gathered. During the flight, pilots may perform an in-flight planning phase. Depending upon the complexity of the aircraft, availability of weather information, and the complexity of the instrument approach procedure ("IAP") or special terrain avoidance procedures for the destination and/or alternate airports, the in-flight planning phase could begin as far as 100-200 nautical miles from the destination airport.

During the in-flight planning phase, the forecasted weather at the destination and/or alternate airports should be reviewed because wind speed and direction are factors which could limit the type of IAP that can be flown at the destination airport. Also, NOTAM information should be reviewed because there may be a factor(s) which could limit the type of IAP that can be flown. Also, there are other factors which could alter the performance of the aircraft, possibly limiting the type of IAP that can be flown.

BRIEF SUMMARY OF THE INVENTION

The embodiments disclosed herein present at least one novel and non-trivial system, device, and method for presenting IAP advisory information to the pilot of an aircraft. With the embodiments disclosed herein, situational awareness may be improved by determining the suitability or availability of one or more IAPs at one or more airports and presenting advisories related to one or more unsuitable or unavailable IAPs.

In one embodiment, a system is disclosed for presenting instrument approach procedure advisory information to the pilot of an aircraft. The system may be comprised of one or more sources of aircraft flight information data, a source of weather minima data, one or more sources of at least one IAP suitability factor, an advisory generator ("AG"), and an aircraft presentation system comprised of a visual display unit, an aural alert unit, or both. In an additional embodiment, there could be a source of manual input data and/or a source of airborne-generated IAP data.

In another embodiment, a device is disclosed for presenting IAP advisory information to the pilot of an aircraft. This device may be comprised of the AG configured to generate identification data representative of the identification of each retrieved published IAP and advisory data corresponding to each unsuitable or unavailable published IAP that has been retrieved from a source of aircraft flight information data.

In another embodiment, a method is disclosed for presenting IAP advisory information to the pilot of an aircraft, where the method could be performed by the AG. When properly configured, the AG may retrieve flight information data, generate identification data and provide such data to the aircraft presentation system, retrieve weather minima data, receive IAP suitability factor(s) data, determine the suitability or availability of the published IAPs, disable the selectability of one or more unsuitable or unavailable published IAPs, and generate advisory data and send it to the aircraft presentation system. In an additional embodiment, the AG may receive override data corresponding to an unsuitable or unavailable published IAP, enable the selectability of the overridden published IAP, and update the advisory data.

In an additional embodiment, the AG may receive airborne-generated IAP data, include the identification of each airborne-generated IAP in the identification data, determine the suitability or availability of each airborne-generated IAP, disable the selectability of one or more unsuitable or unavailable airborne-generated IAP, and generate advisory data and such data to the aircraft presentation system. Also, the AG may receive override data corresponding to an unsuitable or unavailable airborne-generated IAP, enable the selectability of the overridden airborne-generated IAP, and update the advisory data.

BRIEF DESCRIPTION OF THE DRAWINGS

FIG. 2A depicts weather minima tables for four IAPs.

FIG. 2B depicts weather minima tables for four additional IAPs

FIG. 3A illustrates an example of selectively-enabled IAPs.

FIG. 3B illustrates a first example of selectively-enabled and selectively-disabled IAPs.

FIG. 3C illustrates a second example of selectively-enabled and selectively-disabled IAPs.

FIG. 3D illustrates a third example of selectively-enabled and selectively-disabled IAPs.

FIG. 3E illustrates a fourth example of selectively-enabled and selectively-disabled IAPs.

FIG. 3F illustrates an example of selectively-disabled IAPs.

FIG. 3G illustrates a fifth example of selectively-enabled and selectively-disabled IAPs.

FIG. 3H illustrates a sixth example of selectively-enabled and selectively-disabled IAPs.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
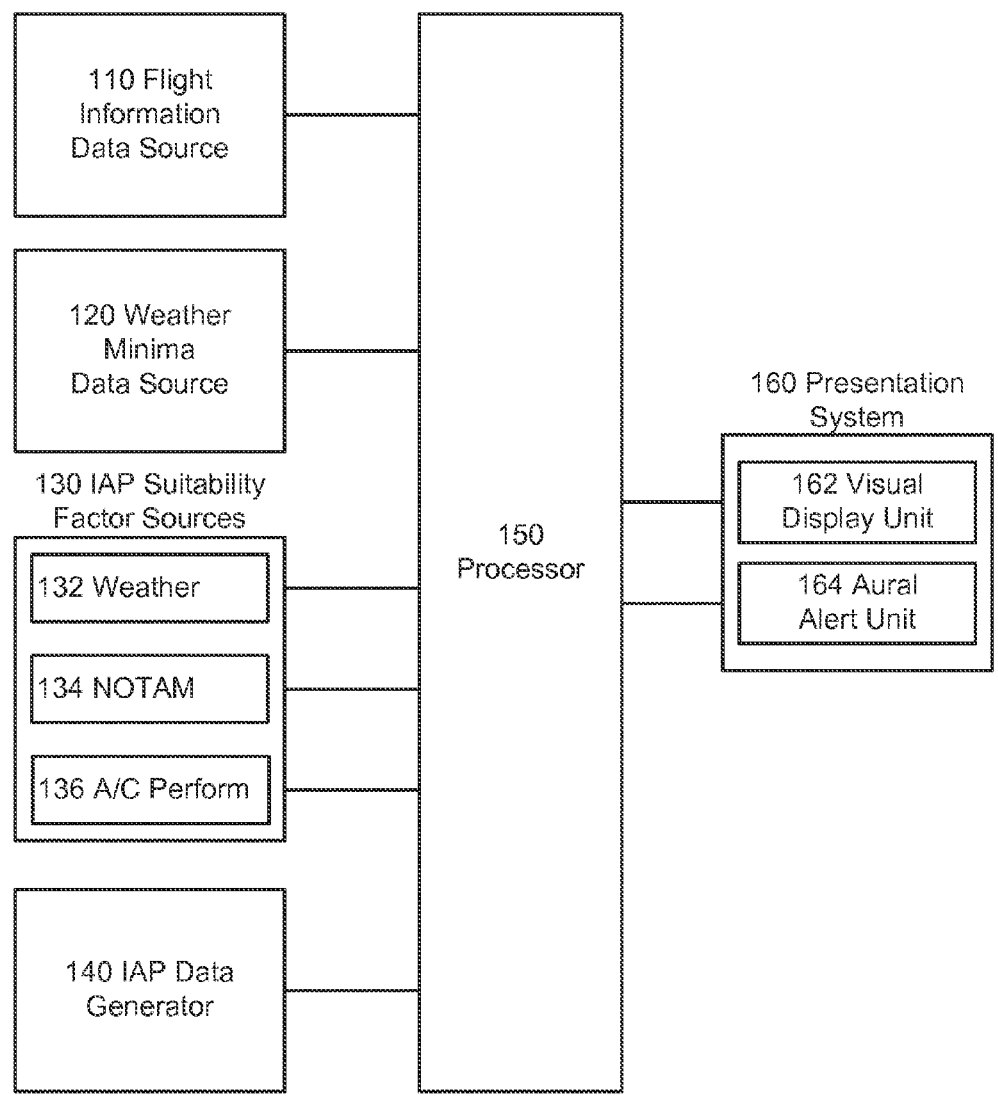
FIG. 1 depicts a block diagram of an IAP advisory information presentation system.

FIG. 1 depicts a block diagram of an instrument approach procedure advisory information ("IAP") presentation system (collectively, "presentation system") 100 suitable for implementation of the techniques described herein. The presentation system 100 of an embodiment of FIG. 1 includes a flight information data source 110, a weather minima data source 120, one or more IAP suitability factor sources 130, an advisory generator ("AG") 150, and a presentation system 160. Additionally, the presentation system 100 could include an IAP data generator 140.

In an embodiment of FIG. 1, the flight information data source 110 could be any source(s) from which flight information may be stored and provided to or retrieved by the AG 150. One flight information data source 110 is commonly known as a flight management system ("FMS"). The FMS may perform a variety of functions performed to help the crew in the management of the flight, and such functions are known to those skilled in the art. In the performance of its many functions, the FMS may receive navigation data from one or more navigation systems containing information regarding the current state of the aircraft. The navigation system could be comprised of, but is not limited to, an air/data system, an attitude heading reference system, an inertial guidance system (or inertial reference system), a global navigation satellite system ("GNSS") or satellite navigation system such as the global positioning system ("GPS"), and a radio altimeter system, all of which are known to those skilled in the art. As embodied herein, the navigation system could provide navigation information including, but not limited to, geographic position, altitude, attitude, speed, vertical speed, heading, radio altitude, and data quality. As embodied herein, aircraft position could be comprised of geographic position (e.g., latitude and longitude coordinates) and altitude, and direction may be derived from either geographic position, aircraft position, or both. As embodied herein, aircraft orientation could be comprised of pitch, roll, and/or yaw information related to the attitude of the aircraft.

It should be noted that, as embodied herein for any source or system in an aircraft including the FMS and/or navigation system, data could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

Functions performed by the FMS could include the receiving of flight plan information and constructing lateral and vertical flight plan components. A pilot could create a flight plan from waypoints stored in a database or select a flight plan stored in a navigation database of the FMS. Also, a flight plan may be modified at any time. A flight plan could be used to guide an aircraft from one position to the next and to compute many flight parameters including, but not limited to, estimated time enroute, estimated time of arrival to a destination airport and/or alternate airport, and estimated fuel consumption between waypoints.

Typically, an FMS is comprised of a navigation database that stores data associated with a flight plan such as, but not limited to, published IAPs, ground-based navigational aids, waypoints, holding patterns, airways, airports, heliports, instrument departure procedures, instrument arrival procedures, runways, precision approach aids, company routes, airport communications, localizer and airway markers, special use airspace, airport sector altitudes, enroute airways restrictions, enroute communications, preferred routes, controlled airspace, geographical references, arrival and/or departure flight planning, path point records, and GNSS Landing Systems. The navigation database employed by the FMS could be a database described in the following document published by Aeronautical Radio, Incorporated ("ARINC"): ARINC Specification 424 entitled "Navigations Systems Data Base" ("ARINC 424"), an aviation industry standard known to those skilled in the art.

In a lateral flight plan, the FMS could perform many functions including, but not limited to, navigational computations, radio navigation aids selections, and providing lateral flight information which could maintain the aircraft along the flight plan from takeoff to approach. In a vertical flight plan, the FMS could compute an optimum speed at each point and aircraft weight and center of gravity. Then, it could compute predictions along the flight plan based on these speeds and weight. It could also provide vertical flight information in reference to such predictions. Other miscellaneous performance computations are also made. Computations and underlying algorithms performed by an FMS are known to those skilled in the art.

A pilot or flight crew may initialize an FMS including, but not limited to, the selection of a flight plan, where such flight plan could provide the basis for all computations and displays. A flight plan may be composed of various lateral and vertical elements that may be defined during initialization, and it may be defined using navigation data stored in the navigation database.

Lateral elements of a flight plan could include origin airport and runway; a departure procedure that may include, but is not limited to, a standard instrument departure; an enroute transition; enroute airways and waypoints; an arrival procedure that may include, but is not limited to, an enroute transition, a standard terminal arrival route procedure ("STAR"), a STAR-approach transition, an approach procedure, a missed approach procedure, and a holding procedure; and a flight plan to an alternate airport. Such procedures may be defined by various legs and waypoints between legs.

Vertical elements could include a takeoff altitude which may include, but is not limited to, a thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels.

As stated above, the FMS is typically comprised of a navigation database that stores data associated with a flight plan including at least one published IAP (if an IAP has been published at the assigned destination and/or alternate airports of the flight plan). Typically, each published IAP contains weather minima information for one or more approach categories of aircraft. The weather minima could be comprised of ceiling and visibility values determined using standards published by aviation-governing authorities, and each approach category could be based upon the "reference landing speed" or "landing configuration stalling speed," where each aircraft is certified in one category. Although each published IAP may contain weather minima information, the ARINC Specification 424 at the time of this writing does not provide for the inclusion of weather minima information.

In an embodiment of FIG. 1, the weather minima data source 120 could be any source(s) in which weather minima for each published IAP is stored and provided to or retrieved by the AG 150. In one embodiment, a manufacturer and/or end-user could create a database of weather minima for each IAP. If a future revision of the ARINC Specification 424 provides for the inclusion of weather minima for each IAP, then the weather minima data source 120 could be comprised of the navigation database of the FMS.

In another embodiment, those skilled in the art know that display units could be configured to present visual replications of IAP charts, where data representative of IAP charts are stored in a database. Because IAP charts are drawn to a standardized format, weather minima information is found at the same location on each IAP chart. For the charts published by the United States Federal Aviation Administration ("FAA"), weather minima are presented at the bottom of each IAP in tabular form (at the time of this writing). Referring to FIGS. 2A and 2B, weather minima tables for eight IAP charts for the Eastern Iowa Airport ("CID") located in Cedar Rapids, Iowa, Unites States are illustrated; these weather minima tables are located at the bottom of the IAP charts. Because a standardized format is employed by publishers of IAP charts (including the FAA), the AG 150 may be programmed with the format to retrieve the weather minima from the database configured to store data representative of IAP charts.

Returning to FIG. 1, the IAP suitability factor sources 130 could be any source(s) from which factors affecting the suitability and/or acceptability of an IAP may be provided to or received by the AG 150. The IAP suitability factor sources 130 could include, but are not limited to, a weather data source 132, a Notice to Airmen ("NOTAM") data source 134, and an aircraft performance factor(s) data source 136.

In an embodiment of FIG. 1, the weather data source 132 could be comprised of any source of weather data including, but not limited to, a datalink system and/or manual input device. The datalink system could be comprised of those system(s) configured to receive data from source(s) external to the aircraft including, but not limited to, ground stations and satellites. Data representative of weather information could be transmitted to the pilot or flight crew of an aircraft via the datalink system which could provide weather information data representative of ceiling and visibility information of the destination and/or alternate airports. Weather data transmitted through a datalink system could originate from or be provided by a plurality of weather data sources including, but not limited to, XM Satellite Radio, Inc. and Universal Weather and Aviation, Inc. Weather data that may be broadcast could include data contained in a variety of weather products such as, but not limited to, Aviation Routine Weather Report ("METAR"), Significant Meteorological Information ("SIGMET"), Airmen's Meteorological Information ("AIRMET"), Next-Generation Radar ("NEXRAD"), surface analysis weather maps, surface pressure, surface wind speed and direction, winds aloft, wind shear detection, echo tops, and freezing levels.

The manual input device comprised of those device(s) configured to receive data that is entered manually by a pilot or flight crew. Such devices could include, but are not limited to, a tactile device such as a tactile device (e.g., keyboard, multi-purpose control display unit ("MCDU"), cursor control device, touch screen device, etc. . . . ) and/or speech recognition systems. The use of a manual input device could enable the pilot or flight crew to input weather data including reported ceiling and visibility data manually via such device after listening to a weather report broadcast over a communications radio.

In an embodiment of FIG. 1, the NOTAM data source 134 may include, but is not limited to, a datalink system and/or manual input device such as those described in the preceding paragraph. A NOTAM may be a notice containing information concerning the establishment, condition, or change in any aeronautical facility, service, procedure or hazard, the timely knowledge of which is essential to personnel concerned with such operations. NOTAMs may be issued and/or reported by aviation-governing authorities for a number of reasons, such as: hazards such as closed runways, taxiways, etc.; unserviceable radio navigational aids; airshows, parachute jumps, and glider or micro light flying; flights by important people such as heads of state; military exercises with resulting airspace restrictions; unserviceable lights on tall obstructions; and temporary erection of obstacles near airfields (e.g., cranes). The datalink system could be configured to receive NOTAM data from source(s) external to the aircraft, and the use of a manual input device could enable the pilot or flight crew to input NOTAM data. The ability to receive NOTAM data from a NOTAM data source has been disclosed by Chiew et al in U.S. patent application Ser. No. 12/569,919 entitled "System, Module, and Method for Presenting NOTAM Information on an Aircraft Display Unit," which is incorporated by reference in its entirety.

In an embodiment of FIG. 1, the aircraft performance factor data source 136 may include one or more sources configured to provide one or more real-time factors affecting the flight performance of an aircraft. Aircraft performance requirements could include those limitations stated in an aircraft flight manual or pilot's operating handbook that may affect aircraft performance during the performance of an IAP and landing. Those skilled in the art understand that this aircraft performance may be affected by one or more real-time factors such as, but not limited to, temperature, winds aloft, barometric pressure, dew point, wind direction, wind speed, empty weight, center of gravity, weight of fuel, weight of cargo, position and/or operability of flaps and/or slats, speed brakes, landing gear, engine performance, and/or air density. Given an undesirable combination of these factors, the performance of the aircraft could be negatively affected. For example, the aircraft may not be able to land within a required distance, climb from a missed approach point of the IAP and maintain a specific climb gradient in a specified aircraft configuration (e.g., one engine inoperative), and/or perform a go-around procedure from the final stage of landing and maintain a specified climb gradient in a specified aircraft configuration (e.g., all engines operating in a landing configuration).

In an embodiment of FIG. 1, the IAP data generator 140 could be any system, module, and/or electronic data processing unit configured to generate an IAP in real-time while the aircraft is in flight. One such IAP data generator 140 has been disclosed by Barber in U.S. patent application Ser. No. 12/283,399 entitled "System, Module, and Method for Generating Procedure Data used in an Avionics System," which is incorporated by reference in its entirety. Through the use of the IAP data generator 140, a pilot may perform an IAP that is not published.

In an embodiment of FIG. 1, the AG 150 may be any electronic data processing unit which executes software or source code stored, permanently or temporarily, in a digital memory storage device as discussed above. The AG 150 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing units. As embodied herein, the AG 150 could be a processor(s) used by or in conjunction with any other system of the aircraft.

The AG 150 may be programmed or configured to receive as input data representative of information obtained from the flight information data source 110, the weather minima data source 120, the IAP suitability factor sources 130, and the IAP data generator 140. As embodied herein, the terms "programmed" and "configured" are synonymous with respect to the execution of software or source code developed for the specific functions and methods embodied herein. The AG 150 may be electronically coupled to systems and/or sources to facilitate the receipt of input data; as embodied herein, operatively coupled may be considered as interchangeable with electronically coupled. The AG 150 may be programmed to execute the methods embodied herein and discussed in detail below. The AG 150 may be programmed to provide output data to the presentation system 160. The AG 150 may be electronically coupled to systems and/or units to facilitate the providing of output data representative of a procedure. It is not necessary that a direct connection be made; instead, such receipt of input data and the providing of output data could be provided through a data bus or through a wireless network.

The presentation system 160 could be comprised of any unit which may present the pilot with visual, aural, and/or tactile indications regarding the suitability of one or more IAPs at one or more airports including, but not limited to, visual display units 162 and/or aural alerting unit 164. Visual display units 162 could be comprised of, but not limited to, a Primary Flight Director, Navigation Display, Head-Up Display, Head-Down Display, MCDU, Engine Indicating and Crew Alerting System, Electronic Centralized Aircraft Monitor, Multi-Function Display, Side Displays, and Data Link Control Display Unit. As embodied herein, the disclosures may apply to a portable device including, but not limited to, tablets which employ a display unit and/or aural alert unit.

The visual display units 162 could be capable of presenting visual advisories related to the suitability of each IAP at an airport(s). In one embodiment, visual advisories could be presented in a textual form including text messages such as "VOR/DME RWY 9 UNSUITABLE (WEATHER)" when the conditions of a weather-related advisory have been met, "VOR/DME RWY 9 UNAVAILABLE (NOTAM)" when the conditions of a NOTAM-related advisory have been met, or "VOR/DME RWY 9 UNSUITABLE (AIRCRAFT PERFORMANCE)" when the conditions of an aircraft performance-related advisory have been met. In another embodiment, visual advisories could be presented in non-textual forms including, but not limited to, graphically distinguishing between suitable and unsuitable IAPs such as changing the appearance of a GUI corresponding to an unsuitable or unavailable IAP. In another embodiment, textual and non-textual advisories could be displayed in color to indicate a level of the advisory, e.g., red may indicate a warning advisory when an IAP has been determined to be unsuitable or unavailable, and amber or yellow may indicate a caution advisory when an unsuitable IAP has been overridden by the pilot. In another embodiment, non-textual and textual advisories could remain steady or flash intermittently as desired by a manufacturer and/or end-user.

Returning to FIG. 1, the aural alerting unit 164 may be any unit capable of producing aural alerts. Aural alerts may be discrete sounds, tones, and/or verbal statements used to annunciate a condition, situation, or event. In one embodiment, an aural alert could call out "WEATHER ADVISORY—VOR/DME RWY 9 UNSUITABLE" when the condition(s) of a weather-related advisory have been met, "NOTAM ADVISORY—VOR/DME RWY 9 UNAVAILABLE" when the condition(s) of a NOTAM-related advisory have been met, or "AIRCRAFT PERFORMANCE ADVISORY—VOR/DME RWY 9 UNSUITABLE" when the conditions of an aircraft performance-related advisory have been met. As embodied herein, both caution and warning aural advisories could be presented in combination with or simultaneous to visual advisories and/or tactile advisories.

The advantages and benefits of the embodiments discussed herein may be illustrated by showing examples of how situational awareness is improved by determining the suitability or availability of one or more IAPs at an airport and presenting advisories related to one or more unsuitable or unavailable IAPs. It should be noted that these examples are provided for the sole purpose of illustration and not limitation. To illustrate the embodiments disclosed herein, the following examples of FIGS. 3A through 3H will be drawn to the IAPs of FIGS. 2A and 2B and how they may be displayed on the screen of an MCDU, a display unit incorporated with a manual input device comprised of tactile buttons to the left and right of the screen labeled 1L through 6L and 1R through 6R, respectively. Although drawn to an MCDU, the embodiments disclosed herein may be applied to units configured for displaying GUIs from which a pilot may select through a manual input device such as a cursor control device or a visual display unit incorporated with a touch screen device.

Referring to FIG. 3A, the ten IAPs for CID of FIGS. 2A and 2B are presented on the screen. The presence of the textual characters "<" and ">" along with the names of the IAPs indicates to the pilot that the selectability of each IAP is enabled after performing the method discussed herein.

In the examples of FIGS. 3B and 3C, assume that weather data received from the weather data source 132 by the AG 150 is representative of a weather forecast that indicates winds from the east (i.e., magnetic compass direction of 90 degrees) at 10 knots, a ceiling of 5,000 feet, and visibility greater than 10 miles at the estimated time of arrival. Because wind direction and speed are factors that may limit the type of approach that can be flown, the AG 150 has determined that, with the exception of the circling approaches, the IAPs of RWYs 13, 27, and 31 are unsuitable. As a result and as shown in FIG. 3B, the AG 150 has disabled the selectability of these IAPs as indicated by the absence of "<" and ">" and provided visual advisories indicating the unsuitability of these IAPs due to weather ("WX"); although a textual advisory is shown in FIG. 3B, the AG 150 could be programmed to change the color of the text of the unsuitable IAPs (e.g., red) and/or present a graphical advisory conveying the unsuitability to the pilot (e.g., change the appearance of a GUI to an appearance corresponding to an unsuitable IAP).

Although not indicated in FIG. 3B, additional IAPs corresponding to circling approaches could be presented on the screen. For example, although the selectability of "RNAV (GPS) RWY 13 UNSUITABLE—WX" has been disabled, an "RNAV (GPS) RWY 13 CIRCLING" could be added to the display (e.g., the 6L or 6R buttons) and enabled for selectability because the ceiling and visibility requirements of the circling approach have been met; likewise, the circling approaches of the other IAPs could be added.

Although the selectability of six IAPs shown of FIG. 3B has been disabled, a pilot may override the determination of the AG 150. For example, if the pilot wants to enable the selectability of the ILS RWY 27, the 1R button could be pressed. In response, the AG 150 could enable the selectability of this IAP; this is shown in FIG. 3C. Although the textual advisory is still shown, it does not have to be; this could be excluded from the display. Also, the AG 150 could be programmed to change the color of the text of the unsuitable but overridden IAP (e.g., amber or yellow) and/or present a graphical advisory conveying the same (e.g., change the appearance of a GUI to an appearance corresponding to an unsuitable but overridden IAP).

In the example of FIG. 3D, assume that weather data received from the weather data source 132 by the AG 150 is representative of a weather forecast that indicates winds from the east (i.e., magnetic compass direction of 90 degrees) at 10 knots, a ceiling of 200 feet, and visibility of ½ mile at the estimated time of arrival. Not only may the factors of wind direction and speed factors limit the type of approach that can be flown but so may the ceiling and/or visibility. As such, the AG 150 has determined that all of the IAPs are unsuitable except for the ILS RWY 9 and the RNAV (GPS) RWY 9. As a result and as shown in FIG. 3D, the AG 150 has disabled the selectability of the unsuitable IAPs and provided visual advisories indicating the unsuitability of these IAPs due to weather. Although the selectability has been disabled for each of these IAPs, a pilot may override the determination of the AG 150 as discussed above.

In the example of FIG. 3E, assume that weather data of FIG. 3D is the same and that performance factor data representative of an inoperative GPS receiver is received from the aircraft performance factor data source 136. As such, not only has the AG 150 determined that all of the IAPs are unsuitable due to weather except for the ILS RWY 9 and the RNAV (GPS) RWY 9, the AG 150 has determined that the RNAV (GPS) IAPs of the four runways are unsuitable. As a result and as shown in FIG. 3E, the AG 150 has disabled the selectability of the unsuitable IAPs and provided a visual advisories indicating the unsuitability of these IAPs due to the weather and performance factor data ("GPS"), leaving only the ILS RWY 9 IAP as selectable. Although the selectability has been disabled for each of these IAPs, a pilot may override the determination of the AG 150 as discussed above.

In the example of FIG. 3F, assume that weather data received from the weather data source 132 is representative of a weather forecast that indicates winds from the south (i.e., magnetic compass direction of 180 degrees) at 25 knots, a ceiling of 200 feet, and visibility of ½ mile at the estimated time of arrival. Also, assume that performance factor data representative of an inoperative GPS receiver is received from the aircraft performance factor data source 136. As embodied herein, the AG 150 could be programmed with the limitations stated in an aircraft flight manual or pilot's operating handbook that may affect aircraft performance during the performance of an IAP and landing. For the purpose of this example, assume that the maximum demonstrated crosswind component for the aircraft is 24 knots. Because the maximum demonstrated crosswind component has been exceeded, the AG 150 will determine that IAPs for Runways 9/27 are unsuitable. As a result and as shown in FIG. 3F, the AG 150 has disabled the selectability of the unsuitable IAPs and provided visual advisories indicating the unsuitability of these IAPs due to the weather and performance factor data ("GPS" and "X-WIND"), leaving no IAPs as selectable. Although the selectability has been disabled for each of these IAPs, a pilot may override the determination of the AG 150 as discussed above.

Because there are no suitable IAPs in the example of FIG. 3F, the AG 150 may be programmed to present an additional visual and/or aural advisories such as "CID UNSUITABLE FOR LANDING" to the pilot. As embodied herein, the AG 150 could be programmed to apply the method disclosed herein to not only the destination airport but also the alternate airport and/or all airports within the aircraft's fuel range. If the alternate is available, the visual and/or aural advisories comprised as, for example, "CID UNSUITABLE FOR LANDING—ALTERNATE IS SUITABLE" could be presented to the pilot if there are one or more suitable IAPs at the alternate airport.

In the example of FIG. 3G, assume that NOTAM data received from the NOTAM data source 134 is representative of a closure of Runways 9/27. As such, the AG 150 has determined that all of the IAPs assigned to Runways 9/27 are unavailable. As a result and as shown in FIG. 3G, the AG 150 has disabled the selectability of the unavailable IAPs and provided visual advisories indicating the unavailability of these IAPs due to the closure. Although the selectability has been disabled for each of these IAPs, a pilot may override the determination of the AG 150 as discussed above.

In the example of FIG. 3H, assume that NOTAM data received from the NOTAM data source 134 is representative of a closure of Runways 9/27 and that the weather data received from the weather data source 132 is representative of a weather forecast that indicates winds from 310 at 25 knots, a ceiling of 200 feet, and visibility of ½ mile at the estimated time of arrival. As such, the AG 150 has determined that all of the IAPs assigned to Runways 9/27 are unavailable due to the NOTAM, the IAPs assigned to Runways 13 and 31 are unsuitable due to the weather; however, assume that the IAP data generator 140 has generated an IAP for Runway 31 which would allow the aircraft to descend to 200 feet above ground level. As a result and as shown in FIG. 3H, the unpublished Runway 31 IAP generated by the IAP data generator 140 has added to the display adjacent to the 6L button and enabled for selectability, while the selectability of each unavailable IAP and unsuitable IAP has been disabled and visual advisories have been presented. Although the selectability has been disabled for each of unavailable IAP and unsuitable IAP, a pilot may override the determination of the AG 150 as discussed above.

The drawings of FIG. 5 depict flowchart 200 disclosing an example of a method for presenting IAP advisory information to a pilot of an aircraft, where the AG 150 may be programmed or configured with instructions corresponding to the following modules embodied in the flowchart. Also, the AG 150 may be a processor of a module such as, but not limited to, a printed circuit board having one or more input interfaces to facilitate the two-way data communications of the AG 150, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

Figure 4:
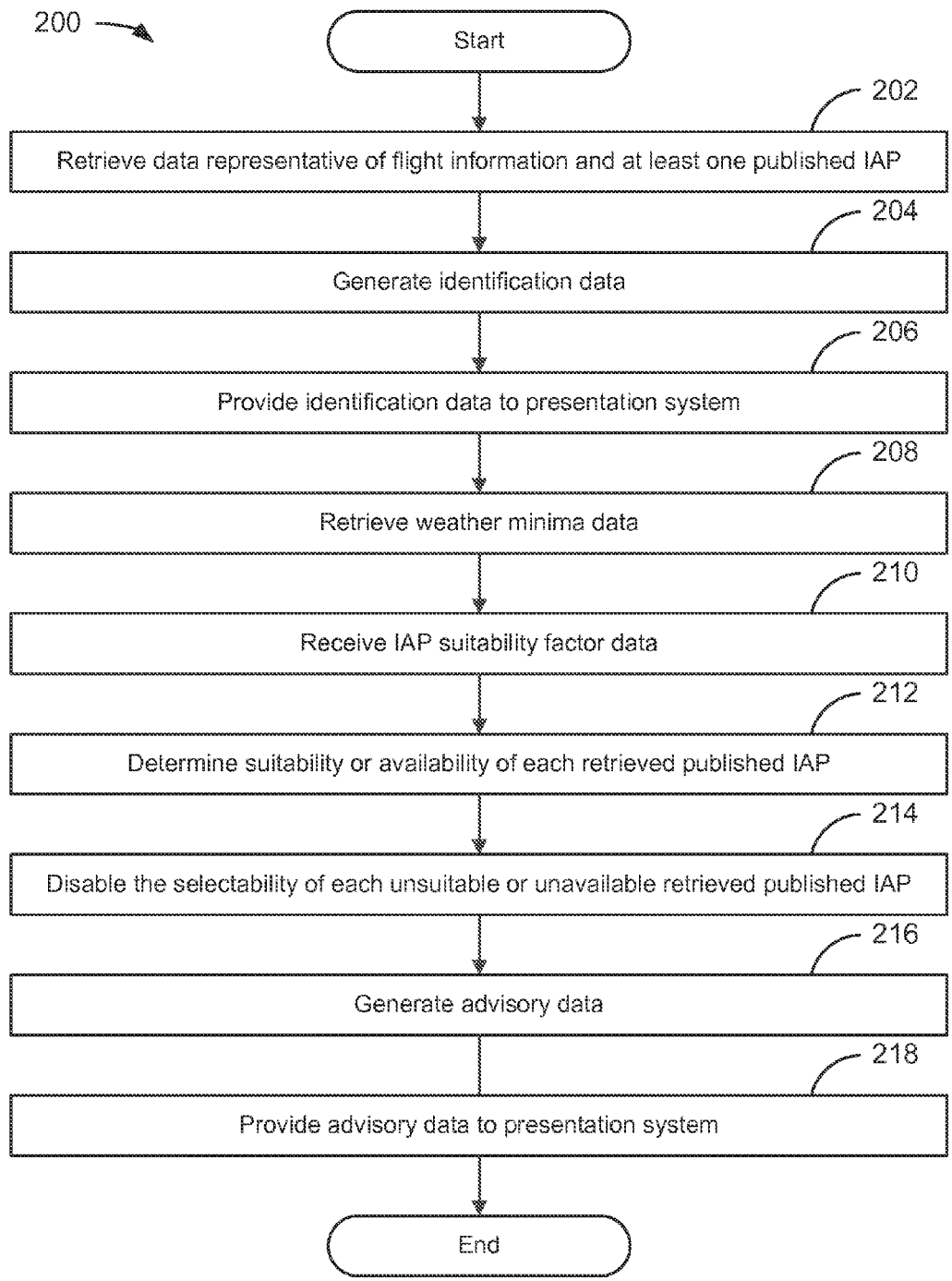
FIG. 4 depicts a flowchart for presenting IAP advisory information to a pilot of an aircraft.

Flowchart 200 begins in FIG. 4 with module 202 with the retrieving of data representative of flight information. This flight information data could be provided by at least one flight information data source 110 and include the FMS. The flight information could include the current position of the aircraft, the identification of the designated airport such as the destination airport, and one or more published IAPs. As embodied herein, the flight information data could include one or more alternative airports. In an additional embodiment, data representative of one or more unpublished IAPs (i.e., those that could be airborne-generated in real-time) could be provided by the IAP data generator 140.

The flowchart continues with module 204 with the generating of identification data representative of the identification of each published IAP retrieved in module 202. In an embodiment in which airborne-generated IAP(s) have been provided, the identification data could be updated to include the identification of each airborne-generated IAP received.

The flowchart continues with module 206 with the providing of the identification data to the presentation system 160, whereby the pilot is presented with each published IAP on the visual display unit 162.

The flowchart continues with module 208 with the retrieving of data representative of weather minima for an aircraft category within which the aircraft falls. As disclosed above, the source weather minima data 120 could be the same database from which the visual replication of paper charts is generated to produce electronic charts.

The flowchart continues with module 210 with the receiving of data representative of one or more IAP suitability factors. As embodied herein, the IAP suitability factor(s) could be provided by the weather data source 132, the NOTAM data source 134, and/or one or more aircraft performance factor data sources 136.

The flowchart continues with module 212 with the determining of the suitability or availability of each retrieved published IAP as a function of the data received in modules 208 and 210. In the embodiment in which airborne-generated IAP(s) have been provided, the suitability or availability of each airborne-generated IAP could be determined as a function of the data received in module 210.

The flowchart continues with module 214 with the disabling of the selectability of each retrieved published IAP that has been determined to be unsuitable or unavailable. In the embodiment in which airborne-generated IAP(s) have been provided, the selectability of each airborne-generated IAP that has been determined to be unsuitable or unavailable could be disabled.

The flowchart continues with module 216 with the generating of advisory data corresponding to each unsuitable or unavailable retrieved published IAP. The advisory data could be representative of advisory information for each unsuitable or unavailable retrieved published IAP and comprised of visual advisory information and/or aural advisory information. In the embodiment in which airborne-generated IAP(s) have been provided, the advisory data could be updated with data representative of each airborne-generated IAP(s) determined to be unsuitable or unavailable.

In an additional embodiment, the AG 150 could be configured to receive data representative of a pilot's override of an unsuitable or unavailable IAP; when received, the selectability of the retrieved published IAP may be enabled, and the advisory data updated in response to the override. In the embodiment in which airborne-generated IAP(s) have been provided, the AG 150 could be configured to receive data representative of a pilot's override of an unsuitable or unavailable airborne-generated IAP; when received, the selectability of the unsuitable or unavailable airborne-generated IAP may be enabled, and the advisory data updated in response to the override.

The flowchart continues with module 218 with the providing of advisory data to at least one presentation system 160 configured to receive such data. When received, the presentation system 160 could present visual advisory information on the screen of the visual display unit 162 and/or present aural advisory information through the aural alert unit 164. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting instrument approach procedure ("IAP") advisory information to a pilot of an aircraft, such system comprising:
at least one source of aircraft flight information data;
a source of chart-published weather minima data;
at least one source of at least one IAP suitability factor;
an advisory generator configured to
retrieve first data representative of flight information comprised of at least
the current position of the aircraft,
a designated airport, and
at least one published IAP at the designated airport,
generate identification data representative of the identification of each retrieved published IAP,
provide the identification data to an aircraft presentation system,
retrieve second data representative of chart-published weather minima data of each retrieved published IAP of the first data,
receive third data representative of at least one IAP suitability factor,
determine the suitability or availability of each retrieved published IAP as a function of the second data and the third data,
disable the selectability of each unsuitable or unavailable retrieved published IAP,
generate advisory data corresponding to each unsuitable or unavailable retrieved published IAP, where
the advisory data is representative of advisory information for each unsuitable or unavailable retrieved published IAP and comprised of a visual advisory, an aural advisory, or both, and
provide the advisory data to the aircraft presentation system; and
the aircraft presentation system configured to
receive the identification data, and
receive the advisory data, whereby
the information represented in the identification data is presented on the screen of a display unit, and
the advisory information represented in the advisory data is presented on the screen of the display unit, through an aural alerting unit, or both.

2. The system of claim 1, wherein one source of aircraft flight information data is a flight management system.

3. The system of claim 1, wherein the source of chart-published weather minima data is a database configured to store data representative of IAP charts.

4. The system of claim 1, wherein at least one source of at least one IAP suitability factor is comprised of
a source of weather data,
a source of Notice to Airmen ("NOTAM") data,
a source of aircraft performance data, or
any combination of
the source of weather data,
the source of NOTAM data, and
the source of aircraft performance data.

5. The system of claim 1, further comprising:
a source of manual input data, such that
the advisory generator is further configured to
receive fourth data representative of an override of an unsuitable or unavailable retrieved published IAP from the source of manual input data,
enable the selectability of the overridden unsuitable or unavailable retrieved published IAP, and
update the advisory data in response to the override.

6. The system of claim 5, wherein the source of manual input data is a touch screen device incorporated into the display unit.

7. The system of claim 1, further comprising:
a source of airborne-generated IAP data, such that
the advisory generator is further configured to
receive fourth data representative of at least one airborne-generated IAP for the designated airport, and
update the identification data to include the identification of each airborne-generated IAP.

8. The system of claim 7, wherein the source of airborne-generated IAP data is the advisory generator.

9. The system of claim 7, wherein
the advisory generator is further configured to
determine the suitability or availability of each airborne-generated IAP as a function of the third data,
disable the selectability of each unsuitable or unavailable airborne-generated IAP, and
update the advisory data to include data representative of each airborne-generated IAP determined to be unsuitable or unavailable.

10. The system of claim 9, further comprising:
a source of manual input data, such that
the advisory generator is further configured to
receive fifth data representative of an override of an unsuitable or unavailable airborne-generated IAP from the source of manual input data,
enable the selectability of the overridden unsuitable or unavailable airborne-generated IAP, and
update the advisory data in response to the override.

11. A device for presenting instrument approach procedure ("IAP") advisory information to a pilot of an aircraft, such device comprising:
an advisory generator configured to
retrieve first data representative of flight information comprised of at least
the current position of the aircraft,
a designated airport, and
at least one published IAP at the designated airport;
generate identification data representative of the identification of each retrieved published IAP;
provide the identification data to an aircraft presentation system;
retrieve second data representative of chart-published weather minima data of each retrieved published IAP of the first data;
receive third data representative of at least one IAP suitability factor;
determine the suitability or availability of each retrieved published IAP as a function of the second data and the third data;
disable the selectability of each unsuitable or unavailable retrieved published IAP;
generate advisory data corresponding to each unsuitable or unavailable retrieved published IAP, where
the advisory data is representative of advisory information for each unsuitable or unavailable retrieved published IAP and comprised of a visual advisory, an aural advisory, or both; and
provide the advisory data to the aircraft presentation system, whereby
the information represented in the identification data is presented on the screen of a display unit, and
the advisory information represented in the advisory data is presented on the screen of the display unit, through an aural alerting unit, or both.

12. The device of claim 11, wherein
the advisory generator is further configured to
receive fourth data representative of an override of an unsuitable or unavailable retrieved published IAP from the source of manual input data;
enable the selectability of the overridden unsuitable or unavailable retrieved published IAP; and
update the advisory data in response to the override.

13. The device of claim 11, wherein
the advisory generator is further configured to
receive fourth data representative of at least one airborne-generated IAP for the designated airport; and
update the identification data to include the identification of each airborne-generated IAP.

14. The device of claim 13, wherein
the advisory generator is further configured to
determine the suitability or availability of each airborne-generated IAP as a function of the third data;
disable the selectability of each unsuitable or unavailable airborne-generated IAP; and
update the advisory data to include data representative of each airborne-generated IAP determined to be unsuitable or unavailable.

15. The device of claim 14, wherein
the advisory generator is further configured to
receive fifth data representative of an override of an unsuitable or unavailable airborne-generated IAP from the source of manual input data;
enable the selectability of the overridden unsuitable or unavailable airborne-generated IAP; and
update the advisory data in response to the override.

16. A method for presenting instrument approach procedure ("IAP") advisory information to a pilot of an aircraft, where such method is performed by an aircraft avionics system processor, such method comprising:
retrieving first data representative of flight information comprised of at least
the current position of the aircraft,
a designated airport, and
at least one published IAP at the designated airport;
generating identification data representative of the identification of each retrieved published IAP;
providing the identification data to an aircraft presentation system;
retrieving second data representative of chart-published weather minima data of each retrieved published IAP of the first data;
receiving third data representative of at least one IAP suitability factor;
determining the suitability or availability of each retrieved published IAP as a function of the second data and the third data;
disabling the selectability of each unsuitable or unavailable retrieved published IAP;
generating advisory data corresponding to each unsuitable or unavailable retrieved published IAP, where
the advisory data is representative of advisory information for each unsuitable or unavailable retrieved published IAP and comprised of a visual advisory, an aural advisory, or both; and
providing the advisory data to the aircraft system, whereby
the information represented in the identification data is presented on the screen of a display unit, and
the advisory information represented in the advisory data is presented on the screen of the display unit, through an aural alerting unit, or both.

17. The method of claim 16, further comprising:

receiving fourth data representative of an override of an unsuitable or unavailable retrieved published IAP from the source of manual input data;

enabling the selectability of the overridden unsuitable or unavailable retrieved published IAP; and updating the advisory data in response to the override.

18. The method of claim 16, further comprising:

receiving fourth data representative of at least one airborne-generated IAP for the designated airport; and updating the identification data to include the identification of each airborne-generated IAP.

19. The method of claim 18, further comprising:

determining the suitability or availability of each airborne-generated IAP as a function of the third data;

disabling the selectability of each unsuitable or unavailable airborne-generated IAP; and updating the advisory data to include data representative of each airborne-generated IAP determined to be unsuitable or unavailable.

20. The method of claim 19, further comprising:

receiving fifth data representative of an override of an unsuitable or unavailable airborne-generated IAP from the source of manual input data;

enabling the selectability of the overridden unsuitable or unavailable airborne-generated IAP; and updating the advisory data in response to the override.

\* \* \* \* \*